(12) United States Patent
Natarajan et al.

(10) Patent No.: US 8,144,624 B2
(45) Date of Patent: Mar. 27, 2012

(54) METHOD AND SYSTEM FOR DISCOVERING A PURE HUB-AND-SPOKE TOPOLOGY

(75) Inventors: Srikanth Natarajan, Fort Collins, CO (US); Swamy Jagannadha Mandavilli, Bangalore (IN); Lawrence M. Besaw, Windsor, CO (US); Anuradha Venkataraman, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 239 days.

(21) Appl. No.: 12/588,655

(22) Filed: Oct. 22, 2009

(65) Prior Publication Data

US 2011/0096695 A1  Apr. 28, 2011

(51) Int. Cl.
*H04L 12/28* (2006.01)

(52) U.S. Cl. ......... 370/254; 709/223; 709/252; 715/736

(58) Field of Classification Search ........................ None
See application file for complete search history.

(56) References Cited

U.S. PATENT DOCUMENTS

| | | | |
|---|---|---|---|
| 7,468,946 B2 * | 12/2008 | Yucel | 370/235 |
| 2005/0025069 A1 * | 2/2005 | Aysan | 370/254 |
| 2005/0286441 A1 * | 12/2005 | Huang | 370/254 |
| 2006/0072589 A1 | 4/2006 | Mandavilli et al. | |
| 2006/0215579 A1 | 9/2006 | Nadeau et al. | |
| 2007/0245034 A1 | 10/2007 | Retana | |
| 2008/0022391 A1 | 1/2008 | Sax | |
| 2009/0157901 A1 | 6/2009 | Asati et al. | |
| 2009/0296714 A1 * | 12/2009 | Gerber et al. | 370/395.31 |
| 2010/0110928 A1 * | 5/2010 | Elias et al. | 370/254 |
| 2011/0069634 A1 * | 3/2011 | Hajiaghayi et al. | 370/254 |

* cited by examiner

*Primary Examiner* — Brian Roberts

(57) ABSTRACT

Presented is a method and system for determining network topology of a Virtual Private Network (VPN) in a Wide Area Network (WAN). The method includes obtaining a list of CE (customer edge) routers in a network, obtaining a list of prefixes advertised by each CE router, iterating, for each prefix, the list of prefixes advertised by all CE routers, verifying, in case a potential hub CE router already exists, whether the second CE router and the potential hub CE router are same, marking, in case a potential hub CE router does not exist, the second CE router as the potential hub CE router, and marking, if there exists a potential hub CE router that advertises every other prefix in the network, the potential hub CE router as hub site and other CE routers as spoke sites.

12 Claims, 3 Drawing Sheets

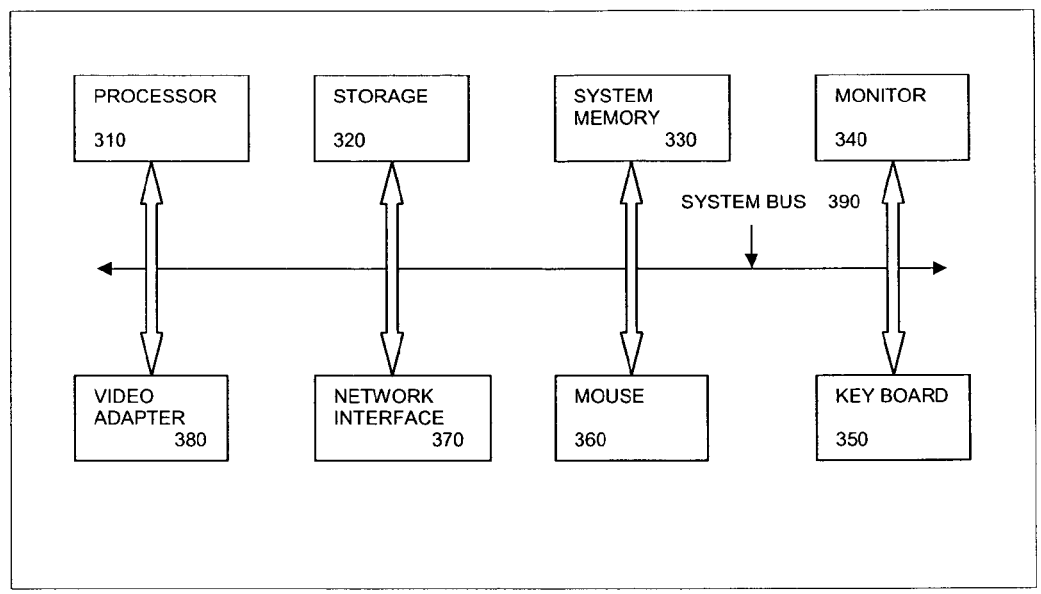
FIG. 3          300

METHOD AND SYSTEM FOR DISCOVERING A PURE HUB-AND-SPOKE TOPOLOGY

BACKGROUND

Large enterprises and business organizations have their office or sales network spread all across the world. To provide network connectivity between these global sites a wide area network (WAN) is used. Simply worded, a WAN is a computer network that covers a wide area. This is in contrast with local area networks (LANs), which are restricted to a small and specific area. WANs are used to connect LANs to enable communication between computers in different locations. With the advent of internet, enterprises have stared using virtual private network (VPN) to interconnect their networks, forming a kind of WAN. Such enterprise customers obtain the VPN connectivity from service providers who provide MPLS/VPN services.

A virtual private network (VPN) can be defined as a network that uses a public telecom infrastructure to provide remote offices or individual users with secure access to their organization's network. Multi Protocol Label Switching (MPLS) VPN technology goes a step further. It provides a connection-oriented, cost efficient mechanism to manage applications between different locations. Enterprise customers with multiple sites are often connected by Layer 3 VPNs running over an MPLS WAN cloud. Typically, each of these sites has one or more CE (Customer Edge) routers connected to the MPLS cloud via the PE (Provider Edge) routers. The enterprise customers obtain these VPN services from service providers. These customers do not have management access to the PE routers and their management is limited only up to the CE routers.

BRIEF DESCRIPTION OF THE DRAWINGS

For a better understanding of the invention, embodiments will now be described, purely by way of example, with reference to the accompanying drawings, in which:

FIG. 3 shows a block diagram of a computer system upon which an embodiment may be implemented.

DETAILED DESCRIPTION OF THE INVENTION

For clarity and convenience, the following definitions are used herein:

The term "network topology" refers to both physical and logical topology of network nodes.

The term "customer edge" includes a customer edge router.

The term "provider edge" includes a provider edge router.

MPLS VPN is a set of processes that use the power of Multi Protocol Label Switching (MPLS) to create virtual private networks (VPNs). A layer 3 MPLS VPN, also known as L3VPN, combines BGP signaling, MPLS traffic engineering and router support for VRFs (Virtual Routing/Forwarding) to create an IP based VPN.

MPLS provides an effective method for supporting VPNs. It is a standards-approved technology for speeding up network traffic flow. The usefulness of MPLS originates from the fact that it can work with many other networking technologies such as IP, Frame-Relay and ATM. MPLS uses layer 3 routing protocols along with layer 2 transport mechanisms. In the context of VPNs, the MPLS/VPN combination provides the capability to form an IP network infrastructure that delivers private network services (for a customer) over a public infrastructure (such as Internet).

An MPLS-based virtual private network (MPLS/VPN) consists of routers and switches interconnected with each other via various transport means. There are two kinds of MPLS-based VPN: Layer 2 VPNs (example are VPLS, VPWS) and Layer 3 VPNs. In Layer 3 VPNs, the service provider edge (PE) router participates in a customer's Layer 3 routing.

In a service provider scenario, customers of the service provider connect to the backbone of the MPLS network through provider edge (PE) routers. The backbone is made up of core routers that provide connectivity between the PE routers. A Customer Edge (CE) router at a customer site connects to the MPLS network at one or more Provider Edge (PE) routers. IP routing protocols are used to exchange routing information and calculate forwarding paths between routers. Examples of IP routing protocols include Open Shortest Path First (OSPF) and Border Gateway Protocol (BGP). MPLS signaling protocols are used to establish and maintain label-switched paths. Examples of MPLS signaling protocols include BGP and Label Distribution Protocol (LDP).

Virtual Private Networks (VPNs), like other networks, are dynamic due to faults, changes in configuration for existing services and provisioning of additional services. When an enterprise customer with multiple sites manages its network, the customer usually has management access until the CE router and not beyond. The CE router does not usually contain any VPN or inter-site connectivity information since it has no VPN information and its only connectivity out of the network is to the PE routers.

The below described embodiments may be used by customers who do not have management access to the PE router. The proposed solution is useful for managing networks where there is no visibility into the MPLS WAN connectivity.

Figure 1:
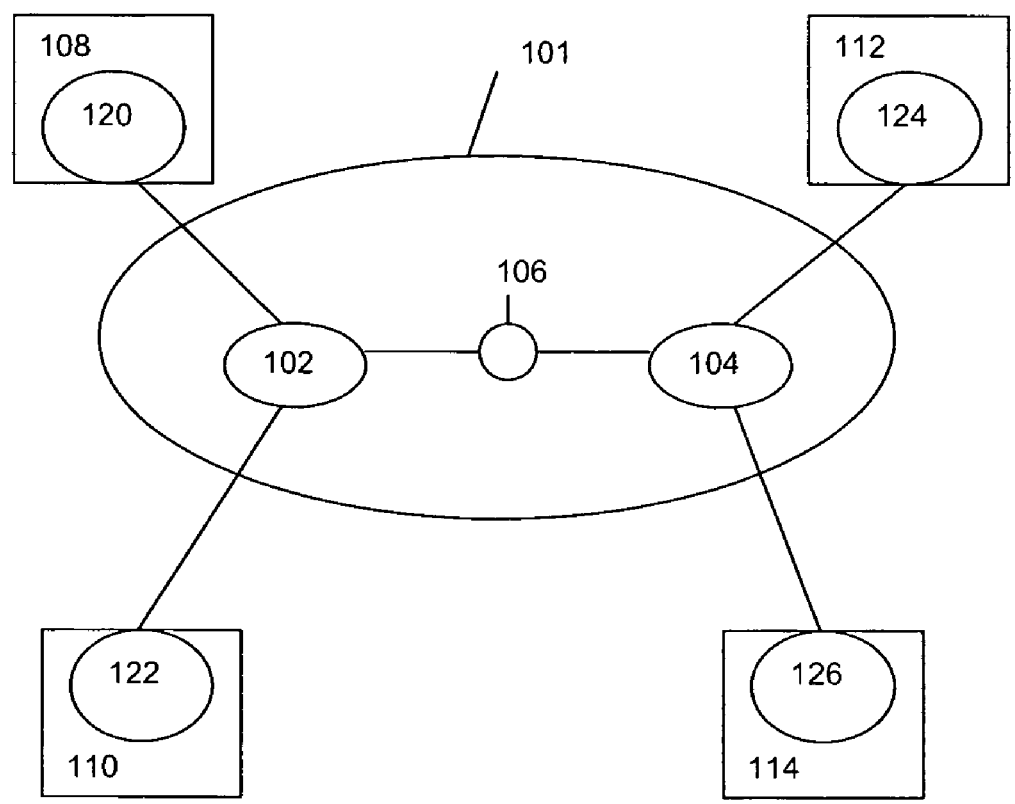
FIG. 1 shows a block diagram of a Multi Protocol Label Switching (MPLS) based Virtual Private Network (VPN) according to an embodiment.

FIG. 1 shows a block diagram of a Multi Protocol Label Switching (MPLS) based Virtual Private Network (VPN) (100) for implementing the present invention according to an embodiment. The network comprises a service provider (SP) network (101) and customer sites (108, 110, 112 and 114). The service provider (SP) network (101) comprises a core router (106) and Provider Edge (PE) routers (102 and 104). The customer sites (108, 110, 112 and 114) are connected to the Provider Edge (PE) routers (102 and 104) through Customer Edge (CE) routers (120, 122, 124 and 126). The core router (106) is connected to the Provider Edge (PE) routers (102 and 104).

A service provider (SP) network (101) may be any organization or an enterprise that offers VPN or other IP routing services. The customer sites may be other networks, such as, but not limited to, VPNs, extranets and intranets. Further, the customer sites may be located at diverse geographical locations. To provide an illustration, by way of example, the customer sites may be located at Bali, London, New York, Bangalore, etc.

IP routing protocols, such as, but not limited to, Open Shortest Path First (OSPF) and Border Gateway Protocol (BGP) may be used for exchange of routing information between PE (102 and 104) and CE routers (120, 122, 124 and 126).

As mentioned earlier, in an enterprise setting with multiple sites, a customer usually has management access until the CE router and not beyond. The CE router does not contain any VPN or inter-site connectivity information since it has no VPN information.

Figure 2:
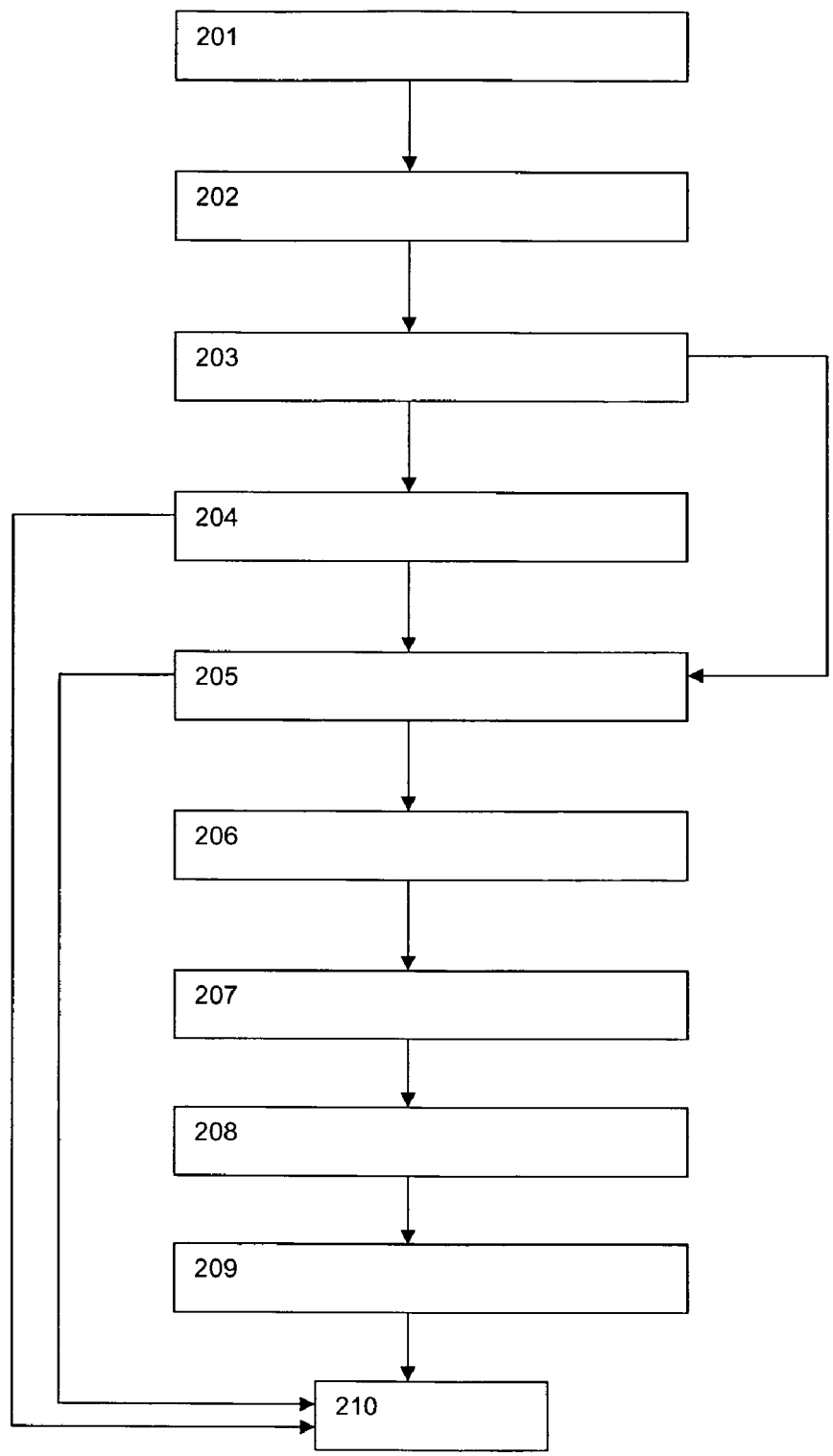
FIG. 2 shows a flow chart of a method for discovering a pure hub-and-spoke topology in a wide area network (WAN) according to an embodiment.

FIG. 2 shows a flow chart of a method for discovering a pure hub-and-spoke topology in a wide area network (WAN) according to an embodiment.

In a hub and spoke topology, one server is designated as the hub, and other servers, called spokes, are connected to the hub. A pure hub-and-spoke topology is one in which all spoke sites talk only to the hub site and the hub site talks to every spoke site. This topology is typically used for WANs that consist of faster network connections between major computing sites and slower links connecting various branches. In certain situations, it may be desirable to use a hub-and-spoke topology so that all spoke sites send all their traffic toward a central site location.

In a pure hub-and-spoke VPN topology, the prefixes advertised by the spoke CEs (Customer Edge) are exported by the spoke PEs (Provider Edge) to the hub PE. The hub PE in turn may do one of the following: it may re-advertise each of the prefixes that it has received from the spoke PEs and its own CE (Customer Edge) to the other spoke PEs; or, it may advertise a summary prefix that encompasses all prefixes exported by the spoke PEs. The fundamental premise is that in a pure hub and spoke topology, every prefix in the topology would have two advertisers: (a) spoke PE advertising the prefix and (b) hub PE re-advertising the prefix. This may be a summary prefix or individual granular prefix.

In a network management system (NMS) environment, the management environment is only aware of the CE devices and does not know about the PE devices. Since the prefixes are propagated to the CEs devices too, the prefixes advertised may be used to determine the type of topology. Thus, if a prefix is discovered that has only one advertiser and if that prefix is not a summary prefix, then a conclusion may be made that the topology is a pure hub and spoke topology and the single CE that advertises all prefixes may be identified as the hub CE. The other routers may be identified as the spoke sites. The method provided below describes steps for discovering a VPN topology if it is based on a hub-and-spoke model.

In step 201, a list of all CE routers in a network (such as a WAN) is obtained. The list of all CE routers may be obtained by means of integration with software like RAMS or through manual configuration from a user.

For clarity, RAMS (Route Analytics Management System), is a software program from Hewlett-Packard Company. It captures the actual route that network traffic takes across IP networks. Rather than requiring agents or synthetic transactions across a network, RAMS non-disruptively participates with the network as a passive router. It performs network discovery and real time troubleshooting of Layer 3 networks by masquerading as a router and peering with other routing devices in the network.

In step 202, a list of prefixes advertised by each of the CE routers is obtained. The list of prefixes may be obtained by means of integration with software, such as, but not limited to, RAMS. CE routers often communicate network topology information with each other. In this regard, CE routers may send network topology information that identifies networks. This is referred to as "prefixes" in reference to the bits of a standard IP address being used as network identifiers. The process of a CE router sending prefix information to a PE router is referred to as advertising a prefix. CE routers advertise prefixes to a PE router to influence the manner in which a PE router routes traffic.

After the list of prefixes advertised by each of the CE routers has been obtained, the following steps 203-208 are performed, for each CE.

In step 203, for each prefix, the list of all prefixes advertised by all CEs is iterated and the second CE which advertises the same prefix either individually or as part of a summary prefix is identified. If the prefix happens to be a default prefix, the method proceeds to step 305, with the second CE specified as the default router.

In step 204, if a second CE which advertises the same prefix either individually or as part of a summary prefix does not exist, a conclusion is made that the topology is not a pure hub and spoke topology and the method exits 310.

In step 205, if a potential hub CE, $CE_h$, already exists, it is verified if the second CE is the same as $CE_h$. If the second CE and $CE_h$ are different, a conclusion is made that the topology is not a pure hub and spoke topology and the method exits 310.

In step 206, if a potential CE does not exist, the second CE as the potential hub CE, $CE_h$, is marked.

In step 207, steps 203 to 205 are repeated for each prefix advertised by the CE.

In step 208, steps 203 to 206 are repeated for each CE in the topology.

In step 209, if there exists a $CE_h$ that advertises every other prefix in the network, then the $CE_h$ may be marked as the hub site and the other CE routers may be determined as spoke sites.

A graphical user interface may be provided, for example, in a network management system application, such as, but not limited to, NNM and/or RAMS, for displaying the hub-and-spoke VPN topology and inter-connectivity between different networks.

FIG. 3 shows a block diagram of a computer system 300 upon which an embodiment may be implemented. The computer system 300 includes a processor 310, a storage medium 320, a system memory 330, a monitor 340, a keyboard 350, a mouse 360, a network interface 370 and a video adapter 380. These components are coupled together through a system bus 390.

The storage medium 320 (such as a hard disk) stores a number of programs including an operating system, application programs and other program modules. A user may enter commands and information into the computer system 300 through input devices, such as a keyboard 350, a touch pad (not shown) and a mouse 360. The monitor 340 is used to display textual and graphical information.

An operating system runs on processor 310 and is used to coordinate and provide control of various components within personal computer system 300 in FIG. 3. Further, as mentioned earlier, a Network Management System (NMS), such as, but not limited to, Network node Manager (NNM) from Hewlett-Packard, may be used on the computer system 300, optionally, in conjunction with RAMS (Route Analytics Management System) application, to manage the VPN implementation of FIG. 1 and the various embodiments described above. A network administrator manages (view, adds, or modifies) the network (VPN, WAN, etc.) via a graphical user interface provided by NNM and/or RAMS.

It would be appreciated that the hardware components depicted in FIG. 3 are for the purpose of illustration only and the actual components may vary depending on the computing device deployed for implementation of the present invention. Further, the computer system 300 may be, for example, a desktop computer, a server computer, a laptop computer, or a wireless device such as a mobile phone, a personal digital assistant (PDA), a hand-held computer, etc.

Some of the advantages provided by the above described embodiments of discovering a pure hub-and-spoke topology may be summarized as follows:

The embodiment described provides an ability to compute a network topology in its actual configuration. Upon availability of inter-site connectivity, path computation, Root Cause Analysis and troubleshooting become more accurate.

It will be appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A computer-implemented method of discovering a pure hub-and-spoke topology, the method comprising:
    obtaining a list of customer edge (CE) routers in a network;
    obtaining a list of prefixes advertised by each CE router;
    iterating, for each prefix, the list of prefixes advertised by all CE routers and identifying a second CE router, which advertises same prefix either individually or as part of a summary prefix;
    verifying, by a processor, in case a potential hub CE router already exists, whether the second CE router and the potential hub CE router are same;
    marking, in case a potential hub CE router does not exist, the second CE router as the potential hub CE router; and
    marking, if there exists a potential hub CE router that advertises every other prefix in the network, the potential hub CE router as hub site and other CE routers as spoke sites.

2. The method according to claim 1, further comprising:
    providing a graphical user interface displaying a hub-and-spoke topology based on the hub site and spoke sites.

3. The method according to claim 1, wherein the list of CE routers is obtained through manual configuration by a user.

4. The method according to claim 1, wherein the list of CE routers is obtained through Route Analytics Management System (RAMS) program.

5. The method according to claim 1, wherein the network is a wide area network (WAN).

6. The method according to claim 1, further comprising:
    repeating the steps of iterating, verifying, and marking the second CE router as the potential hub CE router for each prefix advertised by each CE router in the network.

7. A system for discovering a pure hub-and-spoke topology, the system comprising:
    a processor to:
    obtain a list of all customer edge (CE) routers in a network;
    obtain a list of prefixes advertised by each CE router;
    iterate, for each prefix, the list of prefixes advertised by all CE routers and identify a second CE router, which advertises same prefix either individually or as part of a summary prefix;
    verify, in case a potential hub CE router already exists, whether the second CE router and the potential hub CE router are same;
    mark, in case a potential hub CE router does not exist, the second CE router as the potential hub CE router; and
    mark, if there exists a potential hub CE router that advertises every other prefix in the network, the potential hub CE router as hub site and other CE routers as spoke sites.

8. The system according to claim 7, wherein the processor is further to provide a graphical user interface displaying a hub-and-spoke topology based on the hub site and spoke sites.

9. The method according to claim 7, wherein the network is a wide area network (WAN).

10. The system according to claim 7, wherein the processor is further to:
    repeat the iterate, verify, and mark the second CE router as the potential hub CE router for each prefix advertised by each CE router in the network.

11. A non-transitory computer readable medium storing a computer program, which when executed by a processor performs a method for discovering a pure hub-and-spoke topology, the computer program comprising a set of instructions to:
    obtain a list of all customer edge (CE) routers in a network;
    obtain a list of prefixes advertised by each CE router;
    iterate, for each prefix, the list of prefixes advertised by all CE routers and identify a second CE router, which advertises same prefix either individually or as part of a summary prefix;
    verify, in case a potential hub CE router already exists, whether the second CE router and the potential hub CE router are same;
    mark, in case a potential hub CE router does not exist, the second CE router as the potential hub CE router; and
    mark, if there exists a potential hub CE router that advertises every other prefix in the network, the potential hub CE router as hub site and other CE routers as spoke sites.

12. The non-transitory computer readable medium according to claim 11, further comprising:
    repeat the set of instructions to iterate, verify, and mark the second CE router as the potential hub CE router for each prefix advertised by each CE router in the network.

* * * * *

UNITED STATES PATENT AND TRADEMARK OFFICE
CERTIFICATE OF CORRECTION

PATENT NO. : 8,144,624 B2
APPLICATION NO. : 12/588655
DATED : March 27, 2012
INVENTOR(S) : Srikanth Natarajan et al.

It is certified that error appears in the above-identified patent and that said Letters Patent is hereby corrected as shown below:

In column 6, line 30, in Claim 9, delete "method" and insert -- system --, therefor.

Signed and Sealed this
Ninth Day of April, 2013

Teresa Stanek Rea
*Acting Director of the United States Patent and Trademark Office*